Patented Nov. 3, 1936

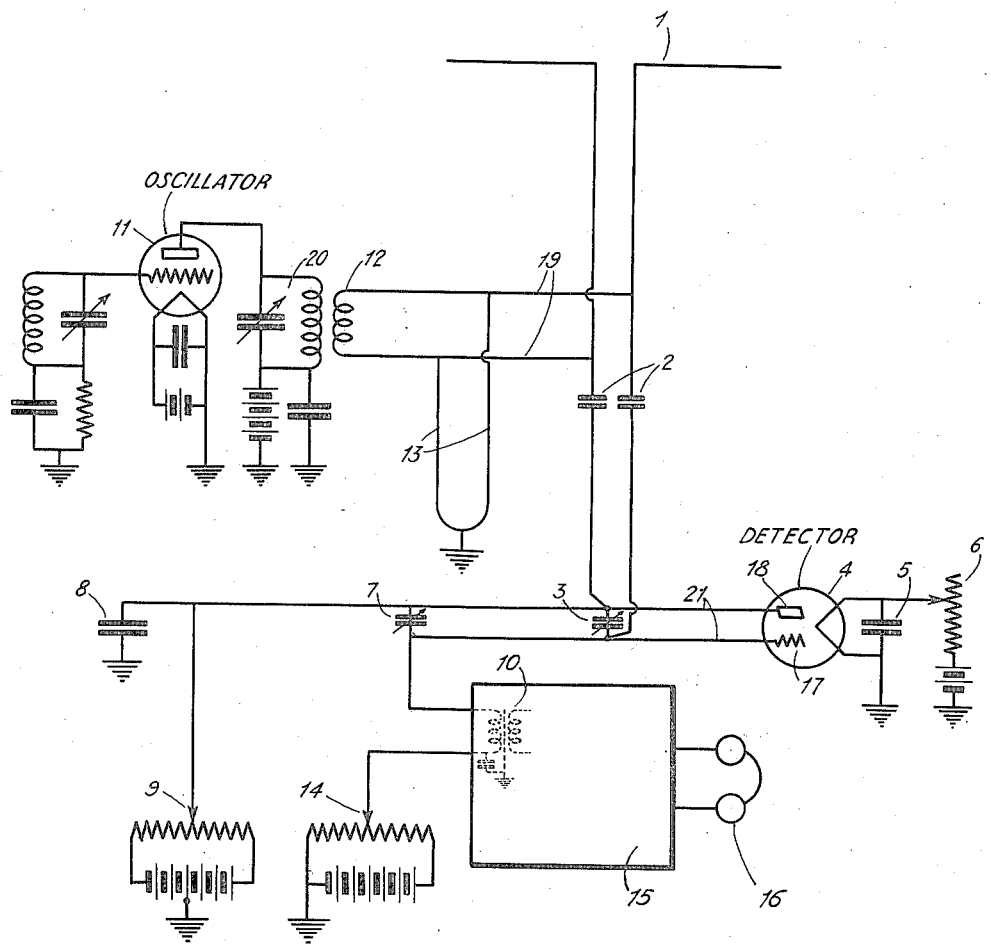

2,059,601

UNITED STATES PATENT OFFICE 2,059,601

ULTRASHORT WAVE RECEIVING SYSTEM

Harold O. Peterson and Ralph W. George, Riverhead, N. Y., assignors to Radio Corporation of America, a corporation of Delaware Application February 1, 1935, Serial No. 4,472

3 Claims. (Cl. 250—20)

This invention relates to improvements in ultra high frequency receiving circuits, and more particularly to such circuits wherein a detector operating on the Barkhausen principle is employed.

The term "Barkhausen" is herein used broadly as being descriptive of any type of electron discharge device using a grid which is maintained at a high positive potential and an anode at a much lower potential with respect to the cathode, whereby oscillations of electrons about the grid may or may not be made to occur, depending upon the adjustment of the circuit constants and voltages.

It is known that in receivers a self-oscillating ultra high frequency detector of the Barkhausen type may be used to provide a desired intermediate frequency. Barkhausen oscillators, however, are subject to various disadvantages, since they are extremely sensitive to slight changes in voltages on the electrodes of the tubes, circuit constants, and aging of the tubes, in view of which it is frequently difficult to maintain control of the frequency of oscillations produced, amplitude of oscillation, and the proper conditions for maximum sensitivity.

The present invention has for one of its objects to overcome these disadvantages in ultra short wave receivers employing Barkhausen detectors.

Another object is to provide an ultra high frequency receiving circuit wherein the amplitude and frequency of the heterodyne oscillations can readily be controlled.

A further object is to provide an ultra high frequency detector which is not especially critical to electrode potentials and currents and whose sensitivity can easily be adjusted to maximum. This last object may be achieved by making the circuit conditions and applied potentials such that they are not favorable to the occurrence of self-sustained ultra high frequency oscillations in the detector. The adjustment of the circuit may be likened to an ordinary regeneration control and for the purposes of this invention it may be said that the sensitivity of the detector is determined mainly by its regeneration. In other words, the detector is so tuned as not to oscillate, and the tendency to oscillate is caused by regeneration.

In brief, the present invention comprises an ultra short wave receiver employing a separate stable and controllable source of heterodyne oscillations, such as a harmonic of a stable oscillator, the output of the heterodyne source being arranged to beat with the incoming oscillations. A Barkhausen detector functions to give the desired intermediate frequency which is subsequently amplified and detected.

A better understanding of the invention may be had by referring to the following detailed description which is accompanied by a drawing illustrating, diagrammatically, a complete ultra short wave receiving system embodying the principles of the invention.

Referring to the single figure of the drawing, there is shown a simple doublet antenna system 1 connected through coupling condensers 2 to the grid 17 and anode 18 of an ultra high frequency Barkhausen detector 4, the cathode of which has a by-pass condenser 5 connected across its legs and a rheostat 6 for controlling the current therethrough.

Attached to the transmission wires connecting the antenna 1 to the detector are a pair of leads 19 which extend to coil 12 which is electromagnetically coupled to the output 20 of a stable heterodyne oscillator 11. Oscillator 11 is of the tuned plate, tuned grid type, and its desired harmonic is coupled via coil 12 to the coupling condensers 2 from which it is fed with the signal to the ultra high frequency detector circuit. Heterodyne oscillator 11 may be any stable oscillator which has a suitable harmonic or fundamental frequency of the desired ultra high frequency value, which may be independently controlled, or controlled by the incoming signal. For example, such automatic frequency control can be effected, in known manner, by mechanical control of the tuning capacity derived from a phase shift detector as used in frequency modulation receivers.

A U shaped circuit 13, which is grounded at its center and whose individual legs are each approximately one quarter of the length of the signal wave, serves to eliminate undesired frequencies from the heterodyne oscillator as well as from the antenna. This circuit, as is known, presents infinite impedance to the incoming waves and much less impedance to the undesired signal frequencies.

The grid 17 and anode 18 of the Barkhausen detector 4 are supplied with suitable potentials by batteries 14 and 9 in their respective potentiometer circuits over lecher wires 21, the latter of which are shunted by condenser 7. Tunable condenser 3 is utilized for tuning the resonant period of the detector circuit to the incoming signal. Condenser 8 serves to ground the anode of detector 4 for radio frequency potentials.

The intermediate frequency which is produced by combining the signal and beat frequencies in detector 4 is taken from the grid side of the ultra high frequency circuit and is coupled through coil 10 to intermediate frequency amplifier and detector 15, the output of which is utilized by the headphones 16, which typifies any suitable utilization device. Intermediate frequency amplifier and detector 15 may take any one of several forms although it is preferred to employ a frequency modulation receiver of the type described in copending application Serial No. 668,232, filed April 27, 1933, the only difference being in the adjustment of the tuning condenser 3 and the electrode potentials for operation.

Condensers 2 also act as blocking condensers to prevent the batteries 9 and 14 from grounding through the U-shaped tuned circuit 13.

Since the ultra high frequency circuit is tuned to the incoming signal by condenser 3 instead of to the heterodyne signal, there is obtained maximum response to the signal.

In the operation of the circuit, assuming that the signal frequency is 600 megacycles, then the ultra high frequency circuit will be tuned to this incoming signal by condenser 3. Heterodyne source 11 is adjusted to give a suitable harmonic, for example, one whose frequency is 600 megacycles plus or minus 5 megacycles, the 5 megacycle value being the desired intermediate frequency. The heterodyne oscillation of 605 (or 595) megacycles will then be impressed on the ultra high frequency detector circuit in combination with the 600 megacycle signal. The grid, plate and cathode voltages of ultra high frequency detector 4 are then adjusted to give the best output of the combined signal and beating oscillation, which is the desired intermediate frequency of 5 megacycles. The intermediate frequency of 5 megacycles will then be amplified and detected at 15 and the output utilized by headphones 16.

This invention is not at all limited to the details of the described embodiment. A detector using more than one ultra high frequency detector tube or rectifying element and having suitable associated circuits, can be used in place of the one ultra-high frequency detector tube and circuit shown in the drawing. The detector tubes may be operated in a magnetic field. The heterodyne oscillation and/or incoming signal may be applied to the detector by means of the given or additional electrodes in the tube, or by modulation of a magnetic field permeating the tube, and not necessarily in the manner shown.

The details of the external, tuned, ultra high frequency circuit are not limited to the embodiment described and this circuit might even possibly be eliminated.

What is claimed is:

1. In an ultra short wave receiver, a dipole antenna for receiving the signal waves, a stable heterodyne oscillator for generating oscillations, to beat with the incoming signal waves coupled to said antenna, and an ultra high frequency non-oscillating detector for receiving the signal waves and heterodyne oscillations and for producing an intermediate frequency, said detector comprising a tube having a grid, anode and cathode, adjustable means for maintaining said grid at a high positive potential and said anode at a much lower potential relative to said cathode, a pair of wires extending from said grid and anode to said means, connections from the arms of said dipole to said pair of wires, a variable condenser across said wires for tuning the ultra high frequency circuit including said wires to the frequency of the incoming signal waves, an intermediate frequency amplifier and detector circuit coupled to that one of said wires which is connected to said grid, and a condenser having one plate connected to ground and another plate connected to that wire which is connected to said anode.

2. In an ultra short wave receiver, a dipole antenna for receiving the signal waves, a stable heterodyne oscillator for generating oscillations to beat with the incoming signal waves coupled to said antenna, and an ultra high frequency non-oscillating detector for receiving the signal waves and heterodyne oscillations and for producing an intermediate frequency, said detector comprising a tube having a grid, anode and cathode, adjustable means for maintaining said grid at a high positive potential and said anode at a much lower potential relative to said cathode, a pair of wires extending from said grid and anode to said means, connections from the arms of said dipole to said pair of wires, a variable condenser across said wires for tuning the ultra high frequency circuit including said wires to a desired frequency, blocking condensers in the connections from said antenna arms to said wires, an intermediate frequency amplifier and detector circuit coupled to one of said wires and a condenser coupled to the other of said wires for grounding it for radio frequency potentials, and a utilization device coupled to said intermediate frequency amplifier and detector circuit.

3. In an ultra short wave receiver, in combination, an antenna for receiving signal waves, a stable heterodyne oscillator for generating oscillations to beat with the incoming signal waves, and an ultra high frequency non-oscillating detector for receiving the signal waves and heterodyne oscillations and for producing an intermediate frequency, said detector comprising a tube having a grid, anode, and cathode electrodes, means for maintaining said grid at a high positive potential and said anode at a much lower potential relative to said cathode, an intermediate frequency amplifier and detector circuit coupled to one of said electrodes of said non-oscillating detector, and a utilization device coupled to said intermediate frequency amplifier and detector circuit.

HAROLD O. PETERSON.
RALPH W. GEORGE.